United States Patent
Pashintsev et al.

(10) Patent No.: US 10,115,031 B1
(45) Date of Patent: Oct. 30, 2018

(54) DETECTING RECTANGULAR PAGE AND CONTENT BOUNDARIES FROM SMARTPHONE VIDEO STREAM

(71) Applicant: Evernote Corporation, Redwood City, CA (US)

(72) Inventors: Alexander Pashintsev, Cupertino, CA (US); Boris Gorbatov, Sunnyvale, CA (US); Eugene Livshitz, Moscow (RU)

(73) Assignee: EVERNOTE CORPORATION, Redwood City, CA (US)

(*) Notice: Subject to any disclaimer, the term of this patent is extended or adjusted under 35 U.S.C. 154(b) by 93 days.

(21) Appl. No.: 15/051,936

(22) Filed: Feb. 24, 2016

Related U.S. Application Data (60) Provisional application No. 62/121,540, filed on Feb. 27, 2015.

(51) Int. Cl.
| | | |
|---|---|---|
| *G06K 9/00* | (2006.01) | |
| *G06K 9/32* | (2006.01) | |
| *G06K 9/46* | (2006.01) | |
| *G06K 9/22* | (2006.01) | |

(52) U.S. Cl.
CPC ............ *G06K 9/3233* (2013.01); *G06K 9/228* (2013.01); *G06K 9/4609* (2013.01); *G06K 9/4652* (2013.01)

(58) Field of Classification Search
CPC ...... G06T 7/13; G06K 9/4652; G06K 9/3233; G06K 9/228; G06K 9/4609
USPC .................................................. 382/165, 199
See application file for complete search history.

(56) References Cited

U.S. PATENT DOCUMENTS

| | | | | |
|---|---|---|---|---|
| 7,529,407 B2* | 5/2009 | Marquering | ....... | G06K 9/00463 382/176 |
| 8,326,078 B2* | 12/2012 | Reddy | ............. | G06K 9/346 382/256 |
| 8,855,375 B2* | 10/2014 | Macciola | ............. | H04N 1/387 358/448 |
| 9,582,896 B2* | 2/2017 | Yi | ............. | G06T 7/251 |

* cited by examiner

*Primary Examiner* — Daniel Mariam
(74) *Attorney, Agent, or Firm* — Morgan, Lewis & Bockius LLP (57) ABSTRACT

Identifying a page with content in a video frame that is part of a video stream of successive video frames includes receiving the video stream, detecting edge segments in the video frame, where each of the edge segments is a candidate for being at least a part of an edge of the page, filtering the edge segments to discard a first subset of the edge segments based on curvature and based on angles between the edge segments and standard axes of the video frame, and identifying the page with content within a portion of a second subset of the edge segments that remain after filtering in response to the portion having geometric closeness to a rectangle. Edge segments having angles that significantly deviate from coordinate angles of the video frame and edge segments with a relatively high curvature may be discarded. A Canny edge detection algorithm may be used.

24 Claims, 5 Drawing Sheets

DETECTING RECTANGULAR PAGE AND CONTENT BOUNDARIES FROM SMARTPHONE VIDEO STREAM

CROSS-REFERENCE TO RELATED APPLICATIONS

This application claims priority to U.S. Prov. App. No. 62/121,540, filed on Feb. 27, 2015, and entitled "DETECTING RECTANGULAR PAGE AND CONTENT BOUNDARIES FROM SMARTPHONE VIDEO STREAM", which is incorporated herein by reference.

TECHNICAL FIELD

This application is directed to the field of capturing and analyzing information and user interfaces, and more particularly to the field of analyzing information and user interfaces in connection with detecting rectangular object boundaries on a series of document images captured as a smartphone video stream.

BACKGROUND OF THE INVENTION

Mobile phones with digital cameras are dominating worldwide mobile device markets. According to market statistics and forecasts, by 2018, annual smartphone shipments are expected to grow to 1.87 billion units, and over 80% of all mobile phones will be arriving to customers with embedded digital cameras of growing quality and with quickly expanding set of features. These shipments will be adding to an already massive audience of approximately 4.5 billion mobile phone users and almost seven billion mobile subscribers. Annual sales by suppliers of phone cameras to mobile phone manufacturers for embedding into smartphones and feature phones is expected to exceed 1.5 billion units per year.

The volume of photographs taken with phone cameras is also rapidly growing. According to market research, photographing with phone cameras has become the most popular activity of smartphone owners, employed by 82% of users, which exceeds the next ubiquitous application, texting, which is utilized by 80% owners. Recent studies indicate that over a quarter of all digital photos have been taken with smartphones. The prevalence of smartphone cameras has been even more prominent on social photo sharing sites where the total count of posted images taken with smartphones has exceeded the cumulative count for stored photographs taken with any non-smartphone equipment.

Hundreds of millions smartphone users are increasingly blending their everyday digital lifestyles with paper habits in their business offices and homes. Paper documents retain a significant position in the everyday information flow of businesses and households. The role of digitizing and capturing paper based information has further increased with the arrival of unified multi-platform content management systems, such as the Evernote service and software developed by Evernote Corporation of Redwood City, Calif. Pages and excerpts from books and magazines, printed newspaper articles, receipts, invoices and checks, tax, financial, medical and other forms, printed reports, business cards, handwritten notes and memos on legal pads, in specialized Moleskine notebooks, on sticky notes or easels, and many other types of printed and handwritten documents are increasingly benefiting from digital capturing, storage and retrieval features of content management systems.

Modern scanners offer solutions for some of these information capturing needs. Accordingly, shipment volumes of mobile scanners are expected to grow from approximately one million to two million units in the next five years. Notwithstanding a growing scanner market, mobile lifestyles of workforce and consumers often requires capturing documents or portions thereof under random conditions where users may not have access to their office or home scanners. Additionally, some paper based formats, such as brochures and books, cannot be captured by sheet-fed scanners and often lack sufficient image quality when captured by flatbed scanners.

The aforementioned limitations have stimulated the development of smartphone based document capturing solutions, such as remote check deposit software or the Scannable software application by Evernote. A new breed of document capturing applications includes advanced algorithms for lighting, color and shape corrections, page border detection, contrast optimization, noise removal and other features aimed at creating optimized images of photographed documents nearing scan quality.

An especially useful time-saving feature of new smartphone applications is automatic scanning where the application detects subsequent pages of a document and takes snapshots of such pages without user intervention. In spite of early achievements in automatic scanning by smartphones, the efficiency of existing methods is still insufficient; scanning smartphone applications may significantly delay automatic shooting of document pages and often cause users to switch to a manual snapshot mode.

One challenge in automatic document scanning with smartphones is related to detecting document pages and pieces of content within pages. In contrast to traditional scanning when the scanned object is known to be a page and is correctly oriented along the coordinate axes, scanning with a smartphone camera introduces significant variations in the scene when a document page may be combined with other objects, slightly rotated, viewed under different angles and with perspective correction, blended with a scene background, etc. Hence, page and content boundaries aren't easily defined by the default conditions of captured images.

Accordingly, it becomes increasingly important to develop efficient methods for detecting page and content boundaries automatic scanning of document pages with smartphone cameras.

SUMMARY OF THE INVENTION

According to the system described herein, identifying a page with content in a video frame that is part of a video stream of successive video frames includes receiving the video stream, detecting edge segments in the video frame, where each of the edge segments is a candidate for being at least a part of an edge of the page, filtering the edge segments to discard a first subset of the edge segments based on curvature and based on angles between the edge segments and standard axes of the video frame, and identifying the page with content within a portion of a second subset of the edge segments that remain after filtering in response to the portion having geometric closeness to a rectangle. Edge segments having angles that significantly deviate from coordinate angles of the video frame and edge segments with a relatively high curvature may be discarded. Detecting edge segments may include using a Canny edge detection algorithm. Identifying a page with content in a video frame that is part of a video stream of successive video frames may also include constructing an edge graph using the second subset of the edge segments that remain after filtering and constructing at least one cycle based on the edge graph, wherein the at least one cycle is used to detect the portion of the second subset of the edge segments. Constructing the edge graph may include determining that a pair of the edge segments are connected within the edge graph based on a probability of the pair of the edge segments being adjacent. Identifying the page may include detecting a presence of page content within a rectangle associated with at least one cycle and may includes determining a likelihood of converting the at least one cycle into a page rectangle with perspective correction corresponding to normal/acceptable view angles in the video frame.

According further to the system described herein, identifying a page with content in a video frame that is part of a video stream of successive video frames includes receiving the video stream, detecting candidate page boundaries using color differences in the video frame by detecting a first pair of substantially parallel lines being substantially orthogonal to a second pair of substantially parallel lines, and identifying the page in an area defined by an intersection of the candidate page boundaries. Detecting candidate page boundaries may use a median cumulative value of color gradients for color components above and below each of the lines, measured in a vicinity thereof. Each of the substantially parallel lines may be selected from a plurality of additional lines that include an axis line that is parallel to an axis of the video frame and a plurality of additional lines that are one or two degrees different from the axis line and where the color gradient values may be determined for segments of the plurality of additional lines. Color gradient values may be decreased for segments of a particular one of the plurality of lines in which a function of a color gradient with respect to distance from the particular one of the plurality of lines forms a sinusoidal shape.

According further to the system described herein, identifying a page with content in a video frame that is part of a video stream of successive video frames includes receiving the video stream, detecting candidate page boundaries based on detecting and subtracting blank rectangular areas from the video frame, and identifying the page in an area defined by an intersection of the candidate page boundaries. Blank rectangular areas may be filled with a solid color that depends on a scene background. The video stream may be provided by a camera of a smartphone.

According further to the system described herein, a non-transitory computer-readable medium contains software that identifies a page with content in a video frame that is part of a video stream of successive video frames. The software includes executable code that receives the video stream, executable code that detects edge segments in the video frame, where each of the edge segments is a candidate for being at least a part of an edge of the page, executable code that filters the edge segments to discard a first subset of the edge segments based on curvature and based on angles between the edge segments and standard axes of the video frame, and executable code that identifies the page with content within a portion of a second subset of the edge segments that remain after filtering in response to the portion having geometric closeness to a rectangle. Edge segments having angles that significantly deviate from coordinate angles of the video frame and edge segments with a relatively high curvature may be discarded. Detecting edge segments may include using a Canny edge detection algorithm. The software may also include executable code that constructs an edge graph using the second subset of the edge segments that remain after filtering and executable code that constructs at least one cycle based on the edge graph, wherein the at least one cycle is used to detect the portion of the second subset of the edge segments. Executable code that constructs the edge graph may determine that a pair of the edge segments are connected within the edge graph based on a probability of the pair of the edge segments being adjacent. Executable code that identifies the page may detect a presence of page content within a rectangle associated with at least one cycle and determines a likelihood of converting the at least one cycle into a page rectangle with perspective correction corresponding to normal/acceptable view angles in the video frame.

According further to the system described herein, a non-transitory computer-readable medium contains software that identifies a page with content in a video frame that is part of a video stream of successive video frames. The software includes executable code that receives the video stream, executable code that detects candidate page boundaries using color differences in the video frame by detecting a first pair of substantially parallel lines being substantially orthogonal to a second pair of substantially parallel lines, and executable code that identifies the page in an area defined by an intersection of the candidate page boundaries. Executable code that detects candidate page boundaries may use a median cumulative value of color gradients for color components above and below each of the lines, measured in a vicinity thereof. Each of the substantially parallel lines may be selected from a plurality of additional lines that include an axis line that is parallel to an axis of the video frame and a plurality of additional lines that are one or two degrees different from the axis line and where the color gradient values may be determined for segments of the plurality of additional lines. Color gradient values may be decreased for segments of a particular one of the plurality of lines in which a function of a color gradient with respect to distance from the particular one of the plurality of lines forms a sinusoidal shape.

According further to the system described herein, a non-transitory computer-readable medium contains software that identifies a page with content in a video frame that is part of a video stream of successive video frames. The software includes executable code that receives the video stream, executable code that detects candidate page boundaries based on detecting and subtracting blank rectangular areas from the video frame, and executable code that identifies the page in an area defined by an intersection of the candidate page boundaries. Blank rectangular areas may be filled with a solid color that depends on a scene background. The video stream may be provided by a camera of a smartphone.

The proposed system processes and analyzes a video flow captured by a smartphone when a user points a camera of the smartphone at a document page, detects vertices (corners) of rectangular areas defining page boundaries and content fragments within pages (collectively, quads), checks stability of a detected quad series over time, takes an automatic photo of the page once the quad series has stabilized, and recalculates quads for the captured page for further document processing.

The system combines three techniques of retrieving quads from frames of the smartphone video flow and from still document shots: (1) an edge graph method, (2) an integral/differential color gradient method, and (3) a blank space retraction method. The need to vary quad detection methods may be caused by variable conditions in the scene photographed by the smartphone camera:

a highly contrast background may yield precise results with the edge graph method;

the same page against a light background may be reasonably detected with the second method;
however, for a white page on a light, nearly white background, both edge and corner detection may be difficult, and the system may rely on the third method, which takes into account content of a page rather than visible boundaries of the page.

The three techniques are described below.

(1) An edge graph technique may be based on an edge detection technique, such as a Canny edges technique, with subsequent creation, processing and analysis of an edge graph. The technique works as follows:

At the initial step, Canny edges in an image corresponding to a video frame may be detected where a parameter defining Canny edges may be simply a vector of RGB values of image pixels (Canny edges are built according to a gradient field of a defining parameter).

Subsequently, edges may be analyzed based on geometry of the edges, including angles between the edges and standard axes and edge curvature:

Edges that are directed sufficiently close to standard coordinates on the image may be retained and subsequently grouped based on certain connection criteria.

Edges with significant slant to standard coordinate axes or edges with significant curvature may be deleted from the edge graph.

Analyzing edges based on angles between the edges and standard axes and edge curvature corresponds to a requirement that a user aims a camera at a document page so that page boundaries are approximately parallel to sides of a video frame. Correspondingly, edges that significantly deviate from a parallel orientation likely belong to miscellaneous objects captured by the camera, rather than the page itself.

Edges that have cusp points, such as angle points or high curvature points, may be split into segments; segments with high curvature may be filtered out, similarly to the previous step.

At the next step, an edge graph is constructed: vertices of the graph correspond to segments obtained at the previous steps that remain after filtering. Edges of the graph may be defined based on a probability of two segments being adjacent within a rectangle defining page boundary. Thus, two collinear close-by segments or two orthogonal segments having some of the ends of the segments nearly touching each other may have high probability. The edge graph may be defined based on a probability threshold, i.e. any pair of vertices that have an above-defined adjacency probability higher than a threshold may be considered interconnected.

At a following step, non-oriented cycles may be identified in the edge graph. Each cycle may be analyzed by several criteria, such as geometric closeness of a cycle to a rectangle;

possibility of converting the rectangle into a page rectangle with perspective correction corresponding to normal/acceptable view angles of the camera;

presence of page content within a rectangle (see below), etc.

A cycle of the edge graph most closely satisfying the above criteria may finally generate a page quad—a quadruple of points on the image corresponding to page corners.

(2) An integral/differential color gradient technique looks for a document page quad represented as an intersection of two pairs of straight lines that are (i) nearly parallel to standard coordinate axes of a video frame and (ii) each of the lines resembles an edge of a page (rather than a line of text). Resemblance by a line segment of a page edge may be estimated by a median cumulative value of color gradients for each RGB component (or other color scheme) above and below the line, measured in a vicinity of the line. Specifically, A bunch of nearly horizontal and nearly vertical lines may be scanning a video frame with a certain vertical/horizontal step. In an embodiment, a bunch may consist of five lines: a horizontal/vertical axis and four lines at angles 1-2 degrees to the axis.

For each line, an $\varepsilon$-vicinity and a grid of $\varepsilon$-segments orthogonal to the line may be built for a middle ⅓ of the line length within the video frame.

Deltas of R, G, B values at ends of each $\varepsilon$-segment may be calculated. If a graph of a color component value along a slightly extended $\varepsilon$-segment has a sigmoidal shape, a delta value may be retained; otherwise, the delta value may be penalized (e.g. multiplied by a certain coefficient between zero and one) for deviations from the sigmoid shape, and especially for breaking monotonicity (oscillating sinusoid type shapes).

Each array $\{\Delta R_i\}$, $\{\Delta G_i\}$, $\{\Delta B_i\}$ of delta values for $\varepsilon$-segments $S_i$ positioned across the available line width (or height) may be ordered and a median value of deltas may represent an integral/differential gradient of a chosen color component for the line. An aggregated value C for the three median values of the components, such as an arithmetic mean, a quadratic mean or a maximum may represent the estimated resemblance between a sought-for page boundary and a current line.

After all line bunches are evaluated, two pairs of lines yielding highest aggregated values, two lines per an x/y coordinate direction, may be chosen. Pairwise intersections between horizontal x-lines and vertical y-lines may define a page quad.

(3) A blank space retraction technique is based on document content. The blank space retraction technique detects maximal blank rectangular areas in a video frame (blank rectangular areas filled with a solid color which may depend on a scene background, for example, there may be multiple background colors but each blank rectangle may have only one color of pixels, possibly after a binarization of the frame image). By subtracting blank rectangles adjacent to frame boundaries, possibly in several iterations, the blank space retraction technique may arrive to a page quad candidate. The candidate may not be the actual page with white margins around page content but rather a bounding rectangle of the content. The blank space retraction technique may be helpful in various challenging cases, for example, when a white document page is placed on a white surface, so that the page boundary is practically indistinguishable from the background. Additionally, the blank space retraction technique may be used for content analysis within the document when residual content remaining after multiple subtractions defines valid content areas. Thus, thinner blank rows and columns may separate paragraphs and columns of text on a multi-column page and may allow parsing a document page into text paragraphs and columns. In some cases, the blank space retraction technique may detect only content quads within a page, while a corresponding page quad may be determined using a bottom-up analysis as a minimal bounding box for all identified content quads.

The three proposed techniques may be used separately and may result in different page quad candidates. Therefore, various arbitration processes may be invoked to decide on a final position of the page quad.

In some instances, only one or two of the techniques may be used without using the other(s). Some or all of the techniques may be used serially (in any order) or in parallel. In some cases, one or more of the techniques may fail to detect a reliable page quad, in which case only technique(s) that return meaningful results are used. If none of the techniques returns useful results, a corresponding video frame may be deemed as not containing a page (missing a page).

If an analysis of a video frame was successful and resulted in acceptable page and content quads, a set of new quads may be built through processing of different frames from the camera video flow; subsequently, stability of quad configurations over time may be assessed. Once the configuration with reasonably well detected quads has been sufficiently stable over a predefined period of time, the system may initiate a still snapshot to capture the document page. Otherwise, the analysis of video flow may continue. After the still snapshot of the document has been taken, quads may be recalculated for the still snapshot using the same techniques.

Note that a specific time interval between subsequent video frames processed by the system may depend both on a factual processing time of a frame and on a predefined processing frequency. The system may process frames with a frequency corresponding to the specific time interval, unless analysis of a previous frame has not been completed.

BRIEF DESCRIPTION OF THE DRAWINGS

Embodiments of the system described herein will now be explained in more detail in accordance with the figures of the drawings, which are briefly described as follows.

DETAILED DESCRIPTION OF VARIOUS EMBODIMENTS

The system described herein provides a mechanism for detection of boundaries and corners of pages and content fragments in document images using three different techniques of analysis of frames of a video stream accessible in the preview mode of a smartphone camera.

Figure 1:
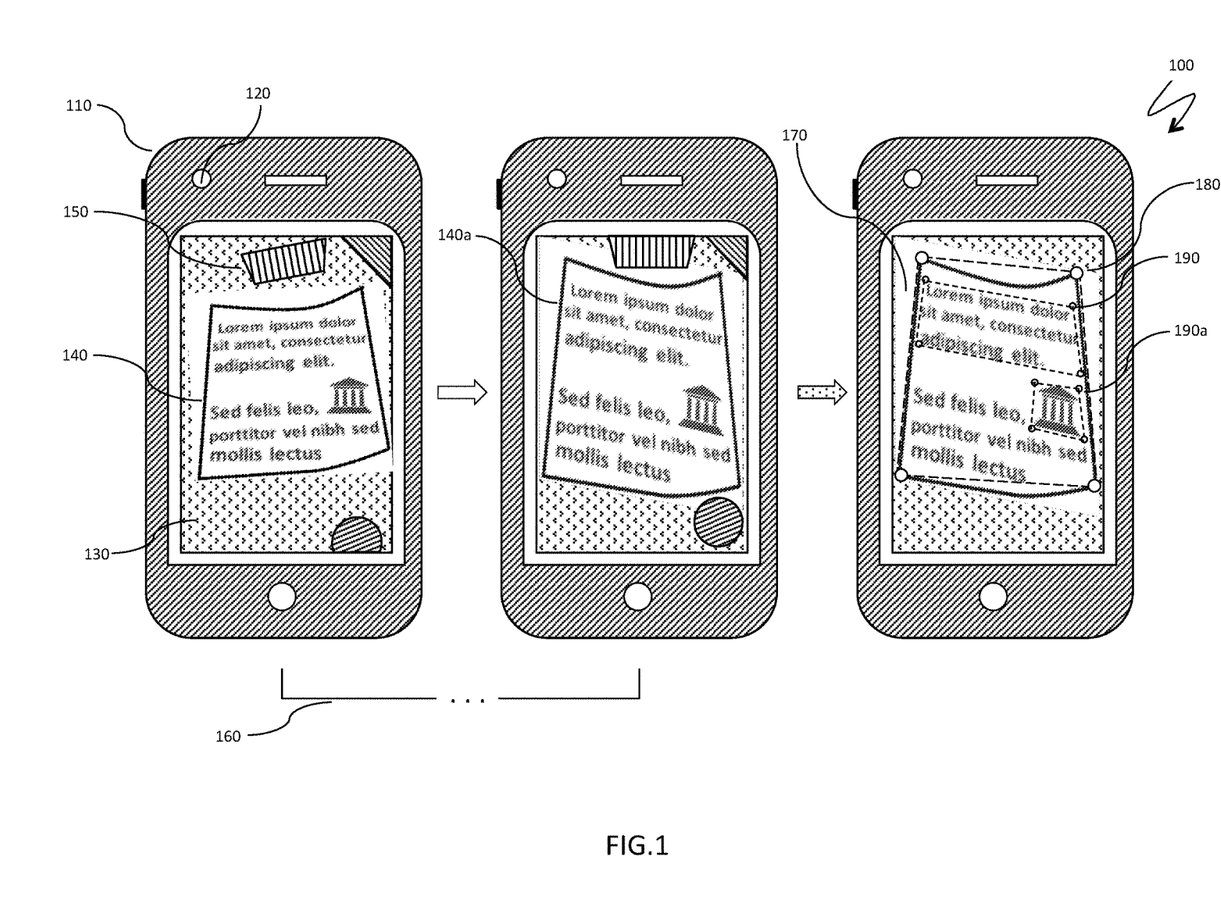
FIG. 1 is a schematic illustration of video flow and of processing of the video flow by the system, according to an embodiment of the system described herein.

FIG. 1 is a schematic illustration 100 of a video flow and of processing of the video flow by the system described herein. A smartphone 110 with an embedded camera 120 is aimed by a user of the camera at a document page arranged on a surface. A frame 130 of a preview video stream of the smartphone camera 120 includes an image 140 of the document page and auxiliary objects 150. The system continues monitoring the video stream, as symbolically shown by a timeline indicator 160. The system detects positions of objects in the video stream as the user continues targeting the document page, possibly changing view angle and distance to the document, as illustrated by an altered view 140a of the document page. Finally, the system registers a sufficiently stable scene and detects boundaries of the document page and fragments (quads) of the document page with a sufficient accuracy and reliability to take a static photo 170 of the document page. The system subsequently filters out auxiliary objects and recalculates a page quad 180 and two object/fragment quads 190, 190a. The object/fragment quad 190 is a paragraph of text and 190a and the object/fragment quad 190a is an image printed on the document page.

Figure 2A:
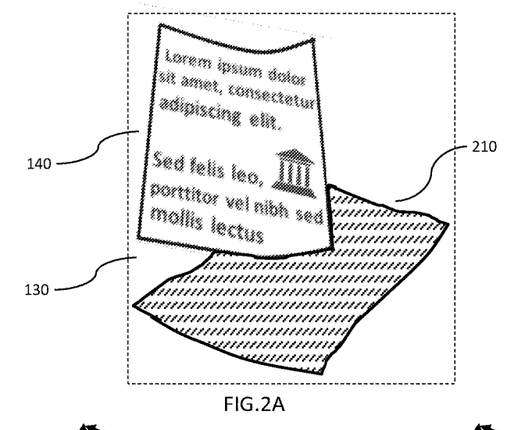
FIGS. 2A-2E schematically illustrate an edge graph technique, according to an embodiment of the system described herein.
Figure 2B:
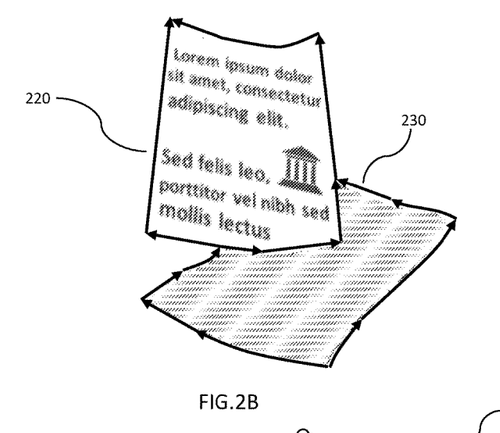
Figure 2C:
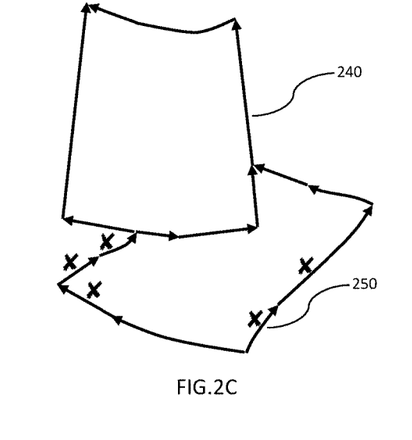
Figure 2D:
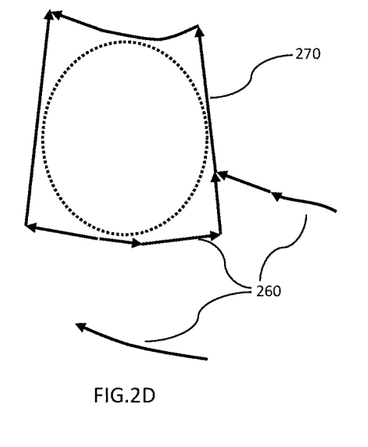
Figure 2E:
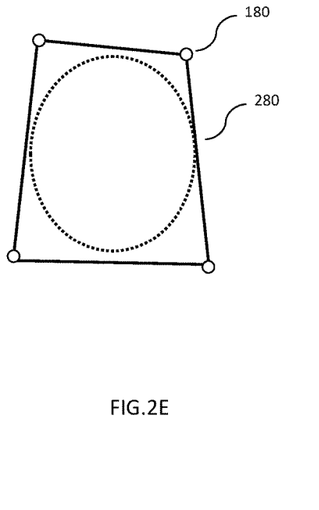

FIGS. 2A-2E are schematic illustrations of an edge graph technique. The frame 130 of a preview video stream in FIG. 2A contains two objects: the image 140 of the document page, positioned close to directions of default coordinates of the frame, and an image 210 of an auxiliary rectangular object; edges of the image 210 of the object are at substantial angles to the default coordinate axes (the object may be a blank sheet of paper, a notepad, etc.). FIG. 2B shows Canny edges 220, 230 built for the document page and for the auxiliary object. The edges may be constructed using any appropriate image analysis method. FIG. 2C shows retained edges 240, satisfying geometric and other requirements explained elsewhere herein, along with deleted edges 250; in the example illustrated herein, a set of edges 250 may be deleted because of excessive angles of the set of edges with respect to coordinate angles of the frame 130. FIG. 2D shows an edge graph 260 and a maximum cycle 270 on the edge graph 260 (note that the maximum cycle 270 is non-oriented, although each edge of the graph 260 is oriented). FIG. 2E illustrates a final page quad with the one corner 180 of four and a page boundary 280.

Figure 3:
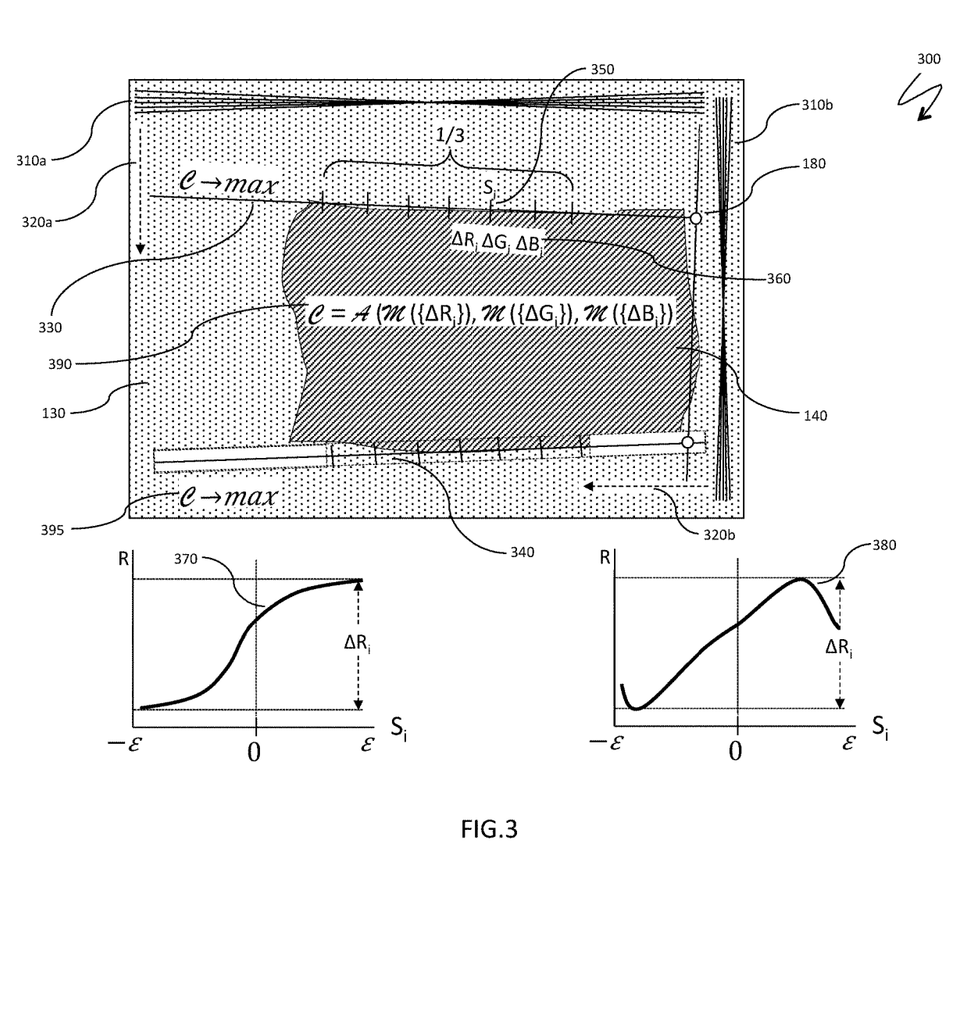
FIG. 3 is a schematic illustration of an integral/differential color gradient technique, according to an embodiment of the system described herein.

FIG. 3 is a schematic illustration 300 of an integral/differential color gradient technique. The frame 130 of the preview video stream contains the image 140 of the document page that nearly blends with the background, as illustrated by filling patterns of the background and the page; text and other contents on the page is now shown. The frame 130 is scanned with two bunches of line segments: a horizontal bunch 310a and a vertical bunch 310b, sliding in a corresponding standard coordinate directions 320a, 320b. One of the lines 330 from the horizontal bunch is chosen to illustrate the technique. A ε-vicinity of a line 340 (shown for viewing convenience near the bottom of the image 140 of the document page) is divided into three equal pieces and a grid of ε-segments $S_i$ 350 is provided for a middle ⅓ of the line 340. A triple of deltas 360 of component RGB values along the segment $S_i$ 350 ($\Delta R_i$, $\Delta G_i$, $\Delta B_i$) is assessed using graphs of each component, as explained elsewhere herein. For the illustration purpose, two sample graphs 370, 380 are shown for a generic ε-segment. A sigmoid shape of an R-component on the graph 370 leads to full acceptance of the corresponding delta value $\Delta R_i$. In contrast, the graph 380 has an oscillating shape; therefore, the delta value $\Delta R_i$ may be either penalized by multiplying over a discounting coefficient (e.g., less than one) or deleted from an array of values used for subsequent calculations. After all triples 360 are built for the grid of ε-segments, with corrections and omissions as explained here and elsewhere herein, median values $M(\{\Delta R_i\})$, $M(\{\Delta G_i\})$, $M(\{\Delta B_i\})$ are constructed from ordered sequences of deltas, as explained elsewhere herein, and a final aggregated value 390, reflecting a score of the line 330, is calculated. Through the scanning process, two best lines from a horizontal bunch 310a and two best lines from a vertical bunch 310b delivering the maximum value to the score C, are chosen, as illustrated by an item 395; the pairwise intersections of the chosen lines define a quad with the corner 180 (only two corners of the page defining quad are shown in FIG. 3).

Figure 4:
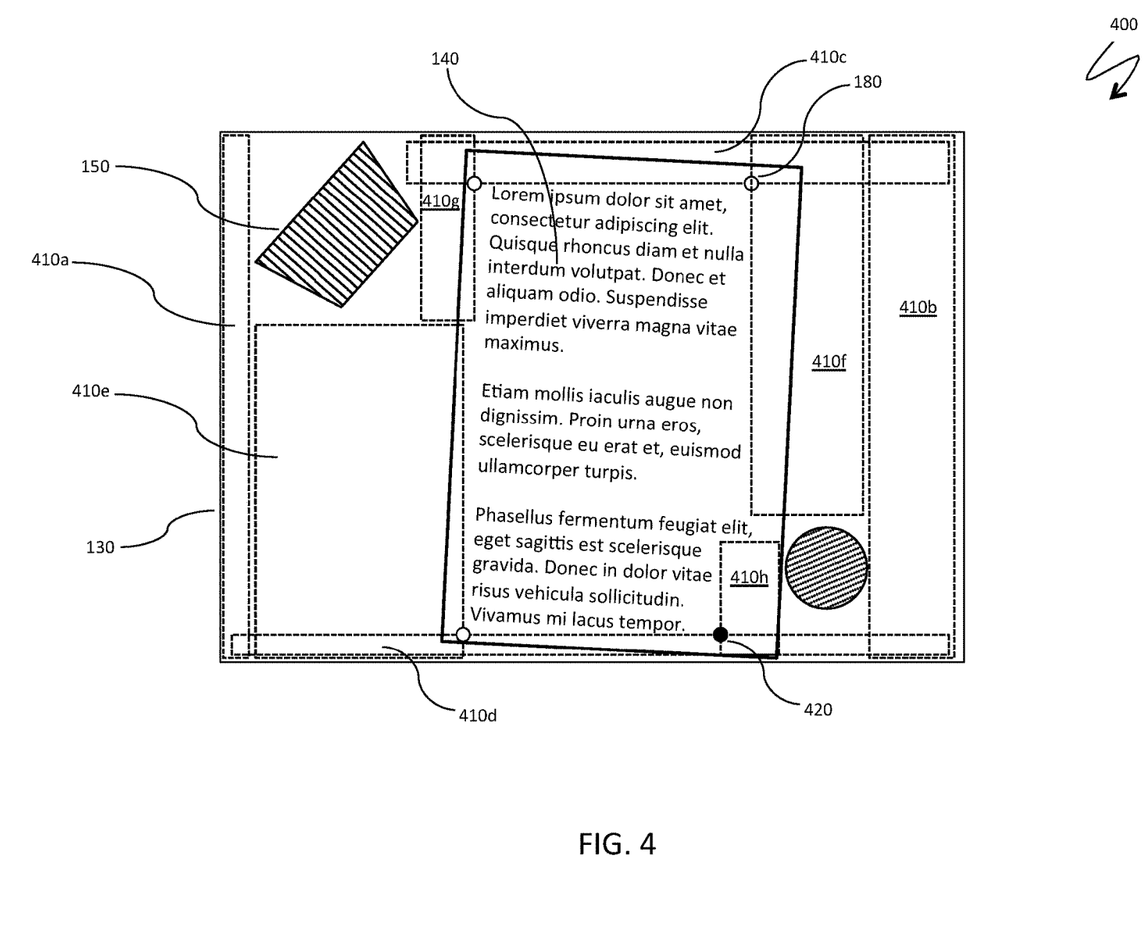
FIG. 4 is a schematic illustration of a blank space retraction technique, according to an embodiment of the system described herein.

FIG. 4 is a schematic illustration 400 of a blank space retraction technique. The frame 130 of the preview video stream contains the image 140 of the document page and the auxiliary objects 150 and other elements that are described in connection with FIG. 1, above. Blank rectangular areas 410a-410h are subsequently subtracted from the frame 130. Remaining space defines auxiliary objects, such as the object 150 surrounded by the rectangles 410a, 410c, 410e, 410g. Similarly, a candidate for the image 140 of the page and content quads may be defined by intersections of appropriate sides of the blank rectangles. For example, the corner 180 of a corresponding quad may be an intersection of two sides of the blank rectangles 410c and 410f. Some vertices may require correction (adjustment), such as a vertex 420, which is not a corner/vertex of either a page or a content quad. As explained elsewhere herein, page quads detecting with the blank space retraction technique may define a bounding box surrounding full page content, rather than a proper page boundary that typically includes blank (white) margins that may be retracted.

Figure 5:
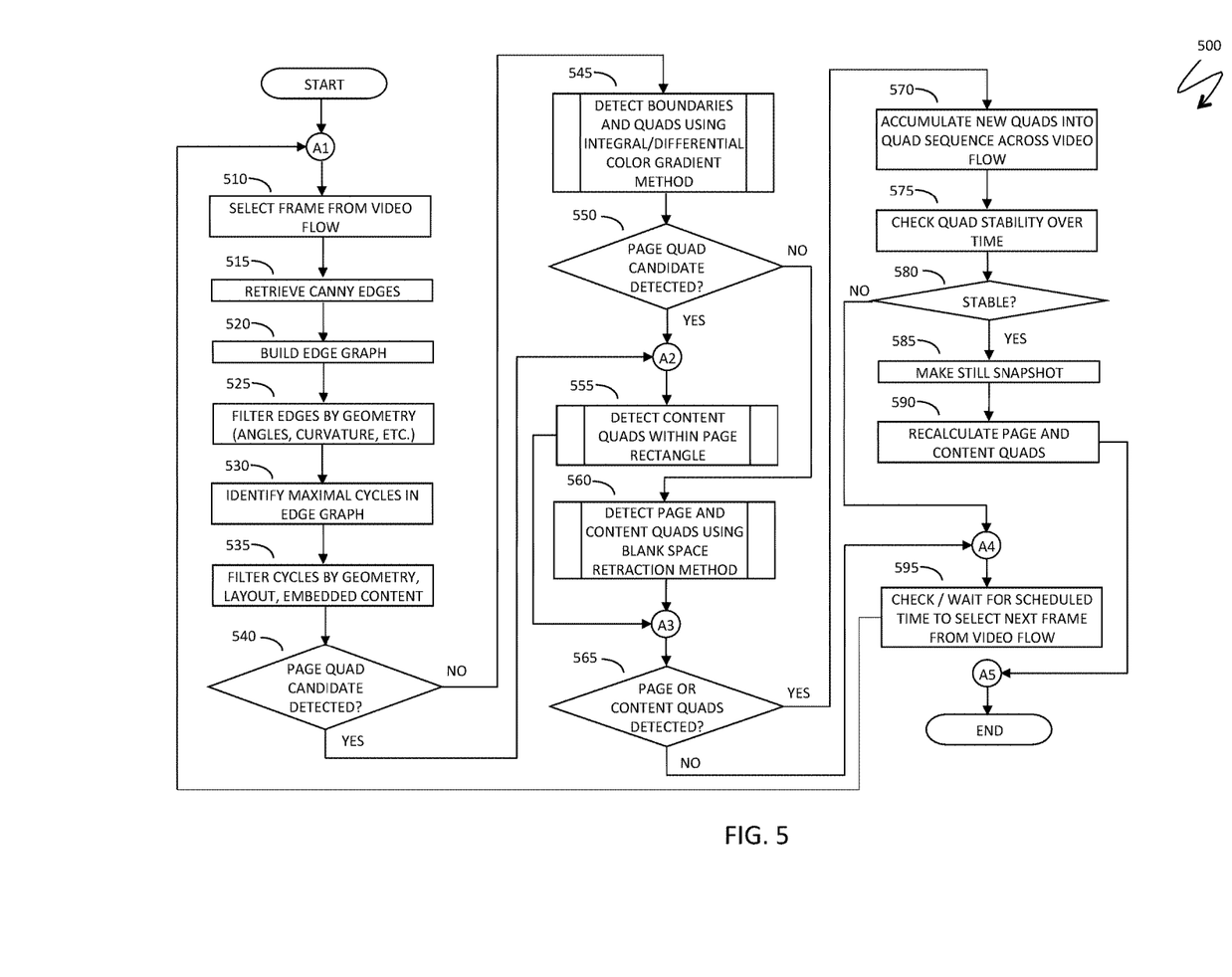
FIG. 5 is a system flow diagram illustrating various concepts of page and content quad detection, according to an embodiment of the system described herein.

Referring to FIG. 5, a system flow diagram 500 illustrates processing in connection with detecting page and content boundaries using a preview video stream of a camera of a smartphone. Processing begins at a step 510 where a user selects a frame from a video flow. After the step 510, processing proceeds to a step 515, where the system retrieves Canny edges (or edges on the image detected with an alternative technique), as explained, for example, in connection with FIG. 2B. After the step 515, processing proceeds to a step 520, where the system builds an edge graph. After the step 520, processing proceeds to a step 525, where the system performs a geometric filtering of edges, as explained elsewhere herein (see in particular FIG. 2C and the accompanying text). After the step 525, processing proceeds to a step 530, where the system identifies maximal cycles in the edge graph (see FIG. 3D and the accompanying text). After the step 530, processing proceeds to a step 535, where the system filters maximal cycles in the edge graph by geometry, layout, embedded content and other factors, as explained elsewhere herein. For example, a cycle that has edges surrounding a blank space in a video frame may be deleted from further analysis.

After the step 535, processing proceeds to a test step 540, where it is determined whether a page quad candidate has been determined among retained cycles of the edge graph. If not, processing proceeds to a step 545 where the system detects page edges and quads using the integral/differential color gradient technique. After the step 545, processing proceeds to a test step 550, where it is determined whether the page quad candidate has been detected using the second technique. If so, processing proceeds to a step 555 where the system detects content quads within the page rectangle. Note that the step 555 may be independently reached from the test step 540 if it was determined that the page quad candidate was detected. If it is determined at the test step 550 that page quad candidates have not been detected, processing proceeds to a step 560, where the system detects page and content quads using the blank space retraction technique, as explained elsewhere herein (see in particular FIG. 4). After the step 560, processing proceeds to a test step 565, where it is determined whether page or content quads have been detected (note that the test step 565 may be independently reached from the step 555). If so, processing proceeds a step 570 where newly detected quads are accumulated into a quad sequence across multiple frames of the video flow. After the step 570, processing proceeds to a step 575, where the system checks quad stability for a sequence of frames displayed in the smartphone camera preview mode over a period of time. After the step 575, processing proceeds to a test step 580, where it is determined whether there are stable quads in the sequence. If so, processing proceeds to step 585 where the system instructs the camera to make a still snapshot of the scene. After the step 585, processing proceeds to a step 590, where the system recalculates page and content quads on the still image using the three techniques explained elsewhere herein. After the step 590, processing is complete.

If it was determined at the test step 580 that stable quads have not been detected in the current sequence of frames of the video flow of the camera of the smartphone, processing proceeds from the step 580 to a step 595, where the system checks (or waits for) a scheduled time to select a next frame from the preview video flow of the camera of the smartphone. Note that the step 595 may be independently reached from the text step 565 if it has been determined that neither page nor content quads have been detected in the current frame of the video flow. After the step 595, processing proceeds back to the step 510 to process the next frame.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, elements and areas of screen described in screen layouts may vary from the illustrations presented herein. Further, various aspects of the system described herein may be implemented using software, hardware, a combination of software and hardware and/or other computer-implemented modules or devices having the described features and performing the described functions. The smartphone may include software that is pre-loaded with the device, installed from an app store, installed from a desktop (after possibly being pre-loaded thereon), installed from media such as a CD, DVD, etc., and/or downloaded from a Web site. The smartphone 110 may use an operating system selected from the group consisting of: iOS, Android OS, Windows Phone OS, Blackberry OS and mobile versions of Linux OS. The smartphone 110 may be connected by various types of wireless and other connections, such as cellular connections in Wide Area Networks, Wi-Fi, Bluetooth, NFC, USB, infrared, ultrasound and other types of connections. A mobile device other than a smartphone may be used. Note that the system described herein may be used with other devices capable of taking a photograph and providing appropriate feedback to a user, such as a wireless digital camera with a screen for providing messages to the user and a mechanism for providing an intermediate image stream.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The software may be bundled (pre-loaded), installed from an app store or downloaded from a location of a network operator. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of identifying a content page in a first video frame, comprising:
    receiving a video stream including a plurality of successive video frames, the successive video frames including the first video frame;
    detecting a plurality of edge segments in the first video frame, wherein each of the plurality of edge segments is a candidate for being at least a part of an edge of the content page in the first video frame;
    filtering the plurality of edge segments to discard a first subset of edge segments from the plurality of edge segments based on a curvature of each edge segment in the first subset and based on one or more angles between each edge segment in the first subset and one or more standard axes of the first video frame, wherein the plurality of edge segments further include a second subset of edge segments each of which is distinct from the first subset of edge segments, and the second subset of edge segments define a region in the first video frame; and
    in accordance with a determination that the region defined by the second subset of edge segments has geometric closeness to a rectangle, identifying the content page within the region of the first video frame defined by the second subset of edge segments.

2. The method, according to claim 1, wherein filtering the edge segments further comprises discarding edge segments having angles that significantly deviate from coordinate angles of the first video frame and edge segments with a relatively high curvature.

3. The method, according to claim 1, wherein detecting the plurality of edge segments includes using a Canny edge detection algorithm.

4. The method, according to claim 1, further comprising:
    constructing an edge graph using the second subset of edge segments that remain after filtering; and
    constructing at least one cycle based on the edge graph, wherein the at least one cycle is used to detect the portion of the second subset of edge segments.

5. The method, according to claim 4, wherein constructing the edge graph includes determining that a pair of edge segments are connected within the edge graph based on a probability of the pair of edge segments being adjacent.

6. The method, according to claim 4, wherein identifying the content page includes detecting a presence of page content within a rectangle associated with the at least one cycle and includes determining a likelihood of converting the at least one cycle into a page rectangle with perspective correction corresponding to normal/acceptable view angles in the first video frame.

7. The method, according to claim 1, wherein the video stream is provided by a camera of a smartphone.

8. A method of identifying a page with content in a video frame that is part of a video stream of successive video frames, comprising:
    receiving the video stream;
    detecting candidate page boundaries using color differences in the video frame by detecting a first pair of substantially parallel lines being substantially orthogonal to a second pair of substantially parallel lines, including using a median cumulative value of color gradients for color components above and below each of the lines, measured in a vicinity thereof; and
    identifying the page in an area defined by an intersection of the candidate page boundaries.

9. The method, according to claim 8, wherein each of the substantially parallel lines is selected from a plurality of additional lines that include an axis line that is parallel to an axis of the video frame and lines that are one or two degrees different from the axis line and wherein the color gradient values are determined for segments of the plurality of additional lines.

10. The method, according to claim 9, wherein the color gradient values are decreased for segments of a particular one of the plurality of additional lines in which a function of a color gradient with respect to a distance from the particular one of the plurality of additional lines forms a sinusoidal shape.

11. A method of identifying a page with content in a video frame that is part of a video stream of successive video frames, comprising:
    receiving the video stream;
    detecting candidate page boundaries based on detecting and subtracting blank rectangular areas from the video frame; and
    identifying the page in an area defined by an intersection of the candidate page boundaries.

12. The method, according to claim 11, wherein blank rectangular areas are filled with a solid color that depends on a scene background.

13. A non-transitory computer-readable medium containing software that identifies a content page in a first video frame, comprising:
    executable code that receives a video stream including a plurality of successive video frames, the successive video frames including the first video frame;
    executable code that detects a plurality of edge segments in the first video frame, wherein each of the plurality of edge segments is a candidate for being at least a part of an edge of the content page in the first video frame;
    executable code that filters the plurality of edge segments to discard a first subset of edge segments from the plurality of edge segments based on a curvature of each edge segment in the first subset and based on one or more angles between each edge segment in the first subset and one or more standard axes of the first video frame, wherein the plurality of edge segments further include a second subset of edge segments each of which is distinct from the first subset of edge segments, and the second subset of edge segments define a region in the first video frame; and
    executable code that determines that the region defined by the second subset of edge segments has geometric closeness to a rectangle and identifies the content page within the region of the first video frame defined by the second subset of edge segments.

14. The non-transitory computer-readable medium, according to claim 13, wherein filtering the edge segments further comprises discarding edge segments having angles that significantly deviate from coordinate angles of the first video frame and edge segments with a relatively high curvature.

15. The non-transitory computer-readable medium, according to claim 13, wherein detecting the plurality of edge segments includes using a Canny edge detection algorithm.

16. The non-transitory computer-readable medium, according to claim 13, further comprising:
executable code that constructs an edge graph using the second subset of edge segments that remain after filtering; and
executable code that constructs at least one cycle based on the edge graph, wherein the at least one cycle is used to detect the portion of the second subset of edge segments.

17. The non-transitory computer-readable medium, according to claim 16, wherein executable code that constructs the edge graph determines that a pair of edge segments are connected within the edge graph based on a probability of the pair of edge segments being adjacent.

18. The non-transitory computer-readable medium, according to claim 16, wherein executable code that identifies the page detects a presence of page content within a rectangle associated with the at least one cycle and determines a likelihood of converting the at least one cycle into a page rectangle with perspective correction corresponding to normal/acceptable view angles in the first video frame.

19. The non-transitory computer-readable medium, according to claim 13, wherein the video stream is provided by a camera of a smartphone.

20. A non-transitory computer-readable medium containing software that identifies a page with content in a video frame that is part of a video stream of successive video frames, the software comprising:
executable code that receives the video stream;
executable code that detects candidate page boundaries using color differences in the video frame by detecting a first pair of substantially parallel lines being substantially orthogonal to a second pair of substantially parallel lines, wherein the executable code that detects candidate page boundaries uses a median cumulative value of color gradients for color components above and below each of the lines, measured in a vicinity thereof; and
executable code that identifies the page in an area defined by an intersection of the candidate page boundaries.

21. The non-transitory computer-readable medium, according to claim 20, wherein each of the substantially parallel lines is selected from a plurality of additional lines that include an axis line that is parallel to an axis of the video frame and lines that are one or two degrees different from the axis line and wherein the color gradient values are determined for segments of the plurality of additional lines.

22. The non-transitory computer-readable medium, according to claim 21, wherein the color gradient values are decreased for segments of a particular one of the plurality of lines in which a function of a color gradient with respect to a distance from the particular one of the plurality of additional lines forms a sinusoidal shape.

23. A non-transitory computer-readable medium containing software that identifies a page with content in a video frame that is part of a video stream of successive video frames, the software comprising:
executable code that receives the video stream;
executable code that detects candidate page boundaries based on detecting and subtracting blank rectangular areas from the video frame; and
executable code that identifies the page in an area defined by an intersection of the candidate page boundaries.

24. The non-transitory computer-readable medium, according to claim 23, wherein blank rectangular areas are filled with a solid color that depends on a scene background.

* * * * *